United States Patent
Bui et al.

(10) Patent No.: US 8,312,951 B2
(45) Date of Patent: Nov. 20, 2012

(54) ARRANGEMENT FOR MOUNTING A HEAT EXCHANGER ON A VERTICAL STRUCTURAL ELEMENT FORMING A MOTOR VEHICLE FRONT END PANEL

(75) Inventors: Joseph Bui, Les Mureaux (FR); Michael Flandin, Broue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 378 days.

(21) Appl. No.: 12/739,564

(22) PCT Filed: Oct. 13, 2008

(86) PCT No.: PCT/FR2008/051855
§ 371 (c)(1),
(2), (4) Date: Apr. 23, 2010

(87) PCT Pub. No.: WO2009/053640
PCT Pub. Date: Apr. 30, 2009

(65) Prior Publication Data
US 2011/0284301 A1    Nov. 24, 2011

(30) Foreign Application Priority Data
Oct. 25, 2007   (FR) ..................................... 07 58558

(51) Int. Cl.
*B60K 11/04* (2006.01)
*F28F 9/00* (2006.01)
(52) U.S. Cl. ......................................... 180/68.4; 165/67
(58) Field of Classification Search ................. 180/68.4; 248/220.21, 221.11, 222.13; 403/353; 165/67
See application file for complete search history.

(56) References Cited

U.S. PATENT DOCUMENTS

| | | | |
|---|---|---|---|
| 2,100,490 A | 11/1937 | Rippingille | |
| 4,541,645 A * | 9/1985 | Foeldesi | 180/68.4 |
| 5,720,341 A * | 2/1998 | Watanabe et al. | 165/67 |
| 6,318,450 B1 * | 11/2001 | Acre | 165/67 |
| 6,571,898 B2 * | 6/2003 | Guyomard | 180/68.4 |
| 7,044,203 B2 * | 5/2006 | Yagi et al. | 165/67 |
| 7,246,674 B2 * | 7/2007 | Andritter et al. | 180/68.4 |
| 7,398,847 B2 * | 7/2008 | Schmitt | 180/68.4 |
| 7,552,757 B2 * | 6/2009 | Hassdenteufel et al. | 165/67 |
| 7,861,988 B2 * | 1/2011 | Hamida et al. | 180/68.4 |
| 8,096,347 B2 * | 1/2012 | Starkey et al. | 165/67 |
| 8,191,664 B2 * | 6/2012 | Steller | 180/68.4 |
| 2005/0178604 A1 | 8/2005 | Burnham | |

FOREIGN PATENT DOCUMENTS

| | | |
|---|---|---|
| FR | 2779221 | 12/1999 |
| FR | 2820710 | 8/2002 |
| JP | 3 92525 | 9/1991 |
| JP | 09032553 | 2/1997 |
| JP | 2006 036039 | 2/2006 |
| WO | 03026908 | 4/2003 |

* cited by examiner

*Primary Examiner* — Jeffrey J Restifo
*Assistant Examiner* — James M Dolak
(74) *Attorney, Agent, or Firm* — Oblon, Spivak, McClelland, Maier & Neustadt, L.L.P.

(57) ABSTRACT

An arrangement for mounting a heat exchanger on a vertical structural element forming a motor vehicle front end panel. The heat exchanger includes a mechanism attaching it to the structural element that are formed by fingers, and the structural element includes housings respectively capable of engaging with the fingers. A locking mechanism is capable of at least longitudinally immobilizing the heat exchanger so as to lock it in a final vertical position corresponding to its use position.

13 Claims, 2 Drawing Sheets

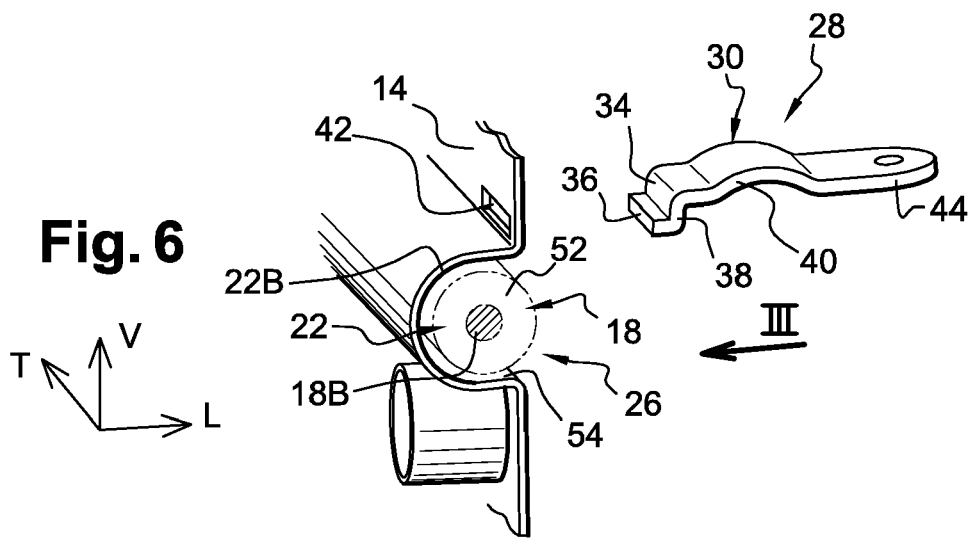
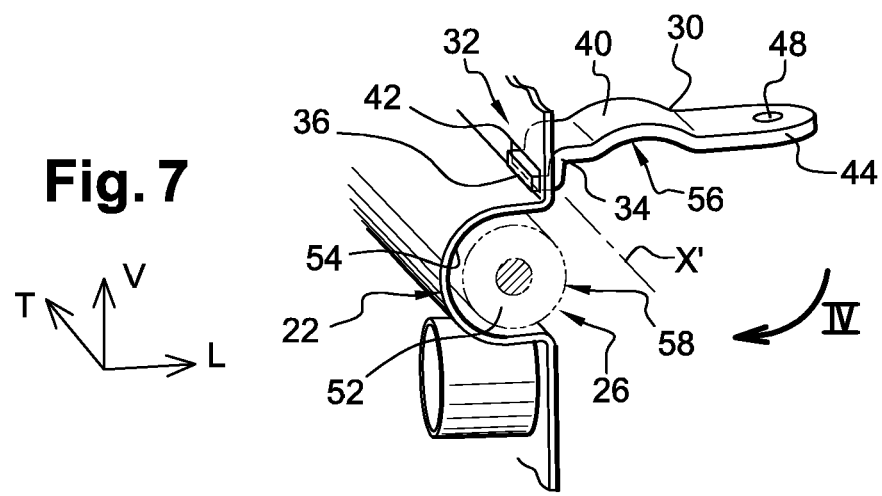
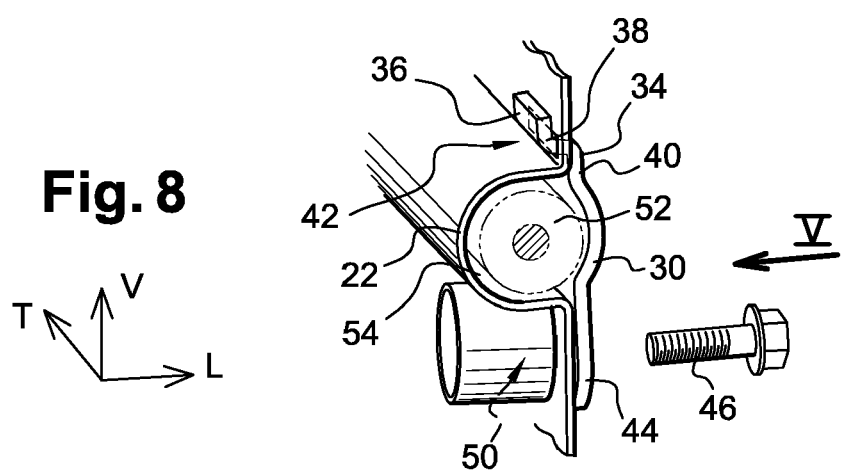

ARRANGEMENT FOR MOUNTING A HEAT EXCHANGER ON A VERTICAL STRUCTURAL ELEMENT FORMING A MOTOR VEHICLE FRONT END PANEL

The invention relates to an arrangement for mounting a heat exchanger on a vertical structural element forming a motor vehicle front end panel.

Numerous examples are known of an arrangement and method for mounting a member such as a heat exchanger on a vehicle front end panel intended to be mounted at one front longitudinal end of the bodywork structure of the vehicle, generally between two side members which oppose one another transversely.

In the majority of current vehicles, the front end panel comprises numerous fixing points for bodywork elements of the vehicle such as the hood, the fenders but also members intended for cooling such as the heat exchanger of the engine, usually known as the radiator, the condenser, the charge air cooler, etc.

Additionally, the front end panel contributes as a structural element to the mechanical strength of the entire bodywork.

For each vehicle, the mounting of the members intended for cooling, such as the heat exchanger of the engine, has to be as simple as possible and to make it possible to guarantee good mechanical strength of the assembly, in particular when the heat exchanger is mounted in a protruding manner, i.e. longitudinally to the front of the structural element forming the front end panel.

The object of the present invention is to provide an arrangement for mounting a heat exchanger on a structural element forming a vehicle front end panel which ensures mounting in an easy, ergonomic and rapid manner.

To this end, the invention provides, according to a first embodiment, an arrangement for mounting a heat exchanger on a vertical structural element forming a motor vehicle front end panel, characterized in that the exchanger comprises means for the hooking thereof onto the structural element, which respectively consist of at least one first pair of fingers and a second pair of fingers and the structural element comprising at least first housings and second housings respectively able to cooperate with the first and second pairs of fingers, in that the first housings of the structural element each comprise, vertically at the top, an opening for permitting the vertical introduction into each first housing of the corresponding hooking finger of the first pair, during a first mounting step of the heat exchanger, the fingers of the first pair of the exchanger cooperating with the first housings of the structural element to form an articulation by means of which the heat exchanger is capable of pivoting about a transverse pivot axis in order, during a second mounting step, to be moved into a final vertical position in which each of the fingers of the second pair is introduced longitudinally from front to back into the second associated housing of the structural element provided to this end with a front longitudinal opening and in that, during a third mounting step, the heat exchanger is immobilized, at least longitudinally, relative to the structural element by means of locking means which are capable of blocking at least one of the fingers of the second pair in the associated housing, so as to lock the heat exchanger in the final vertical position corresponding to its position of use.

The invention also provides, according to a second embodiment, an arrangement for mounting a heat exchanger on a vertical structural element forming a motor vehicle front end panel, characterized in that the heat exchanger comprises means for the hooking thereof to the structural element, which respectively consist of at least one first pair of fingers and a second pair of fingers and the structural element comprising at least first housings and second housings respectively capable of cooperating with the first and second pairs of fingers, in that the second housings of the structural element each comprise, vertically at the top, an opening intended to permit the vertical introduction into each second housing of the corresponding hooking finger of the second pair, during a first mounting step of the heat exchanger, the fingers of the second pair of the exchanger cooperating with the second housings of the structural element to form an articulation by means of which the heat exchanger is capable of pivoting about a transverse pivot axis in order, during a second mounting step, to be moved into a final vertical position in which each of the fingers of the first pair is introduced longitudinally from front to back into the first associated housing of the structural element provided to this end with a front longitudinal opening, and in that, during a third mounting step, the heat exchanger is immobilized, at least longitudinally, relative to the structural element by means of locking means which are capable of blocking at least one of the fingers of the first pair in the associated housing, so as to lock the heat exchanger in the final vertical position corresponding to its position of use.

As a result of the invention, easy, ergonomic and rapid mounting of a member, such as a heat exchanger of the engine, is ensured, whilst implementing locking means which are capable of being standardized for use on different vehicle front faces.

According to further features of the invention, taken in isolation or in combination:

- in the final position of use, the heat exchanger is suspended by the fingers, known as the upper fingers, of the first pair which cooperate with the first associated housings, known as the upper housings, and is immobilized vertically by the fingers, known as the lower fingers, of the second pair introduced into the second associated housings, known as the lower housings.
- the locking means consist of at least one flange which is capable of closing the opening of at least one of the second lower housings to immobilize longitudinally the associated lower finger in the second lower housing and to lock the heat exchanger in the final position of use.
- in the final position of use, the heat exchanger is suspended by the fingers, known as the lower fingers, of the second pair which cooperate with the associated second housings, known as the lower housings, and is immobilized vertically by the fingers, known as the upper fingers, of the first pair introduced into the associated first housings, known as the upper housings.
- the locking means consist of at least one flange which is capable of closing the opening of at least one of the first lower housings to immobilize longitudinally the associated upper finger in the first housing and to lock the heat exchanger in the final position of use.
- the flange is mounted on the structural element by an articulated connection arranged on one first end thereof.
- the flange comprises at least one first stepped end which is formed by a planar end part connected by a bent portion to a central part and in that at least the planar end part is capable of being introduced, longitudinally from front to back, into a complementary slot of the structural element so that at least the bent portion cooperates with the slot to form an articulated connection.
- the flange is capable of pivoting about a transverse axis between at least one initial horizontal position which it occupies after the engagement of its first end, known as the articulating end, through the slot and a final locked position in which the flange extending generally vertically is capable of preventing the finger from leaving the housing through the front longitudinal opening.

at least one second end of the flange is capable of being attached fixedly to the structural element so as to immobilize the flange in its final locked position.

the second end, known as the fixing end, of the flange is fixed to the structural element by screwing, by means of at least one fixing screw.

the first stepped articulating end of the flange is capable of cooperating with the slot so that the flange is temporarily immobilized in a waiting position in which the flange extends at right angles to the structural element and the heat exchanger, before being folded down, during the third mounting step, to its final locked position in which the flange, extending generally vertically, closes the associated housing comprising the finger.

the locking means, such as at least one flange, are premounted on the structural element in a captive manner.

Further features and advantages of the invention will become apparent from reading the following detailed description, and for the understanding thereof reference will be made to the accompanying drawings, in which:

FIGS. 6 to 8 are perspective views which show in detail the locking means and the third mounting step during which the heat exchanger is locked in the final vertical position corresponding to its position of use.

Figure 1:
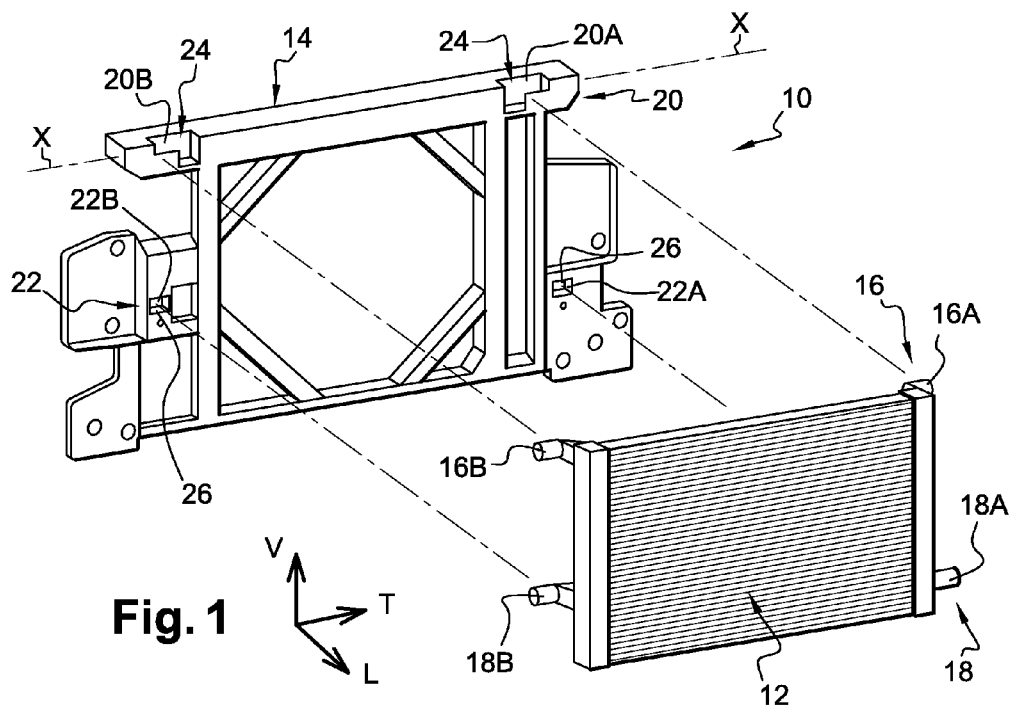
FIG. 1 is a perspective view which shows an embodiment of a heat exchanger before the mounting thereof on an associated structural element forming a vehicle front end panel.

In the description and the claims, the expressions such as "upper" and "lower", "front" and "rear", and the orientations "longitudinal", "vertical" and "lateral" are used in a non-limiting manner with reference to the trihedron (L, V, T) shown in the figures and the definitions provided in the description.

Moreover, elements which are identical, similar or analogous will be denoted by the same reference numerals.

In FIG. 1, a particular embodiment is shown of an arrangement 10 for mounting a heat exchanger 12 which is more particularly intended for being mounted on a vertical structural element 14.

Advantageously, the vertical structural element 14 is a motor vehicle front end panel, longitudinally in front of which is shown the heat exchanger 12 in FIG. 1.

According to the invention, the heat exchanger 12 comprises means for the hooking thereof to the front part of the structural element 14.

The means for hooking the heat exchanger 12 respectively consist of at least one first pair 16 of fingers and a second pair 18 of fingers, said fingers of each pair extending preferably transversely, protruding on both sides of the heat exchanger 12.

The first pair 16 of fingers is arranged vertically in the upper part of the heat exchanger 12 above the second pair 18 of fingers, each pair of upper fingers and lower fingers 18 respectively comprising a finger which extends transversely to the right and a finger which extends transversely to the left.

Thus, the first pair 16 of fingers, known as the upper fingers, comprises at least one upper right finger 16A and an upper left finger 16B, whilst the second pair 18 of fingers, known as the lower fingers, comprises at least one lower right finger 18A and one lower left finger 18B.

The structural element 14 comprises at least first housings 20, known as the upper housings, and second housings 22, known as the lower housings, respectively capable of cooperating with the first and second pairs 16, 18 of hooking fingers for mounting the heat exchanger 12.

The first upper housings 20 of the structural element 14 consist of an upper right housing 20A and an upper left housing 20B, each of the housings 20A, 20B being open vertically at the top by means of an opening 24.

Each opening 24 of the first upper housings 20A, 20B is intended to permit the introduction, in this case in a generally vertical direction, of the upper hooking finger 16A, 16B of the first pair 16 in each housing 20A, 20B which is associated therewith, and this occurs during a first mounting step of the heat exchanger 12.

Figure 2:
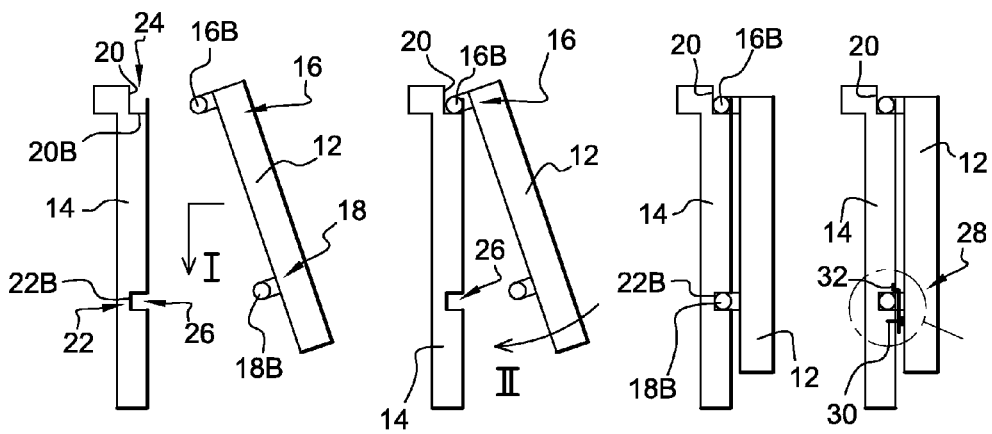
FIGS. 2 to 5 are side views which show schematically the heat exchanger and the structural element and which illustrate the first and second mounting steps for hooking the heat exchanger to the structural element.
Figure 2:
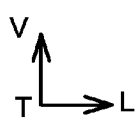

During this first mounting step of the heat exchanger 12 which is illustrated by the arrow I in FIG. 2, the exchanger 12 is moved into an initial position which is inclined relative to the vertical and the upper fingers 16A and 16B of the first pair 16 are engaged in the first upper housings 20A and 20B.

The introduction of the upper fingers 16A, 16B in the housings 20A, 20B is carried out, therefore, generally vertically from top to bottom, the weight of the exchanger 12 facilitating the passage of the fingers 16A, 16B through the upper vertical openings 24.

Figure 3:
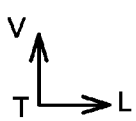

At the end of this first mounting step and as illustrated in FIG. 3, the heat exchanger 12 now temporarily occupies an inclined intermediate position in which the upper hooking fingers 16A, 16B of the exchanger 12 cooperate with a part of the first housings 20A, 20B of the structural element 14 to form an articulation.

Figure 4:
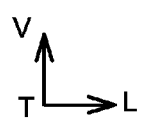

By means of the articulation, the heat exchanger 12 is capable of pivoting about a transverse pivot axis X in order, during a second mounting step, to be moved along the arrow II from the inclined intermediate position illustrated by FIG. 3 to a final vertical position illustrated by FIG. 4.

To reach the final vertical position illustrated in FIG. 4, each of the lower fingers 18A, 18B of the second pair 18 is introduced longitudinally from front to back into the second associated lower housing 22A, 22B of the structural element 14, each housing 22 being provided to this end with a front longitudinal opening 26.

In the final position of use, the heat exchanger 12 is preferably suspended by the upper hooking fingers 16A, 16B of the first pair 16 which cooperate with the first associated upper housings 20A, 20B and the heat exchanger 12 is thus immobilized vertically by the lower fingers 18A, 18B of the second pair 18 which cooperate with the second associated lower housings 22A, 22B.

Figure 5:
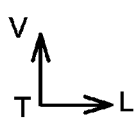

During a third mounting step, more particularly illustrated in FIGS. 6 to 8, the heat exchanger 12 is immobilized, at least longitudinally, relative to the structural element 14 by means of locking means 28 which are capable of blocking at least one of the fingers, in this case the lower fingers 18A, 18B of the second pair 18, in at least one associated housing, in this case the second housing 26, so as to lock the heat exchanger 12 in said final vertical position corresponding to its position of use shown in FIG. 5.

According to a preferred embodiment, the locking means 28 consist of at least one flange 30 which is capable of closing the opening 26 of at least one of the second lower housings 22A, 22B to immobilize longitudinally one of the associated lower fingers 18A, 18B in the second housing 22A, 22B and in this manner to lock the heat exchanger 12 in the final position of use.

Advantageously, the flange 30 is mounted on the structural element 14 by an articulated connection 32 arranged on a first end thereof, for example in this case the upper end 34.

Preferably, the flange 30 comprises at least one first stepped end 34 which is formed by a planar end part 36 connected by a bent portion 38 to a central part 40 and at least the planar end part 36 is capable of being introduced, longitudinally from front to back along the arrow III, shown in FIG. 6, into a complementary horizontal slot 42 of the structural element 14 so that at least the bent portion 38 of the flange 30 cooperates with the slot 42 to form the articulated connection 32.

Preferably, a horizontal slot 42 is arranged vertically above each lower housing 22A and 22B.

Advantageously, the flange 30 is capable of pivoting along the arrow IV about a transverse axis X' between at least one initial horizontal position as illustrated in FIG. 7 which it occupies after the engagement of its first end 36, known as the articulating end, through the slot 42 and a final locked position in which the flange 30, which extends generally vertically, is capable of preventing the lower finger from leaving the second housing 22 through the longitudinal front opening 26.

Preferably, at least one second end 44 of the flange 30, longitudinally opposed to the first articulating end 36, is capable of being attached fixedly to the structural element 14 so as to immobilize the flange 30 in its final locked position illustrated in FIG. 8.

Advantageously, the second end 44, known as the fixing end, of the flange 30 is fixed to the structural element 14 by screwing, by means of at least one fixing screw 46.

To this end, the fixing end 44 of the locking flange 30 comprises a calibrated through-hole 48 passed through by the shank of the screw 46 which is received in a complementary tapped hole 50 of the structural element 14, coaxial to said through-hole 48.

The screw 46 is introduced longitudinally from front to back along the arrow V shown in FIG. 8 through the holes 48 and 50 so that in the tightened position, the head of the screw 46 cooperates with a part of the front face of the fixing end 44 of the locking flange 30 adjacent to the through-hole 48.

Advantageously, the fixing of the flange 30 by screwing is a reversible fixing mode allowing a subsequent operation on the heat exchanger 12, the dismantling thereof being able to be achieved by carrying out the mounting steps in reverse order, i.e. in particular by starting by releasing the screw 46 to carry out the dismantling of the flange 30 and to release the heat exchanger 12.

Advantageously, the first stepped articulating end 34 of the flange 30 is capable of cooperating with the slot 42 so that the flange 30 is temporarily immobilized in a position known as the waiting position.

In this waiting position, the flange 30 extends at right angles to the structural element 14 and to the heat exchanger 12.

Preferably, the flange 30 is connected in such a waiting position after the implementation of the second mounting step to avoid any interference, if present, i.e. after the fingers 18A, 18B have been introduced into the housings 22A, 22B along the arrow II shown in FIG. 3.

During the third mounting step, the flange 30 is folded down from the waiting position to its final locked position in which the flange 30, which extends generally vertically, then closes the associated housing 22 comprising the finger 18.

Preferably, the locking means 28 such as at least one flange 30 are pre-mounted on the structural element 14, advantageously in a captive manner.

Advantageously, the locking means 28 comprise two flanges 30, a first flange associated with the lower right finger 18A received in the housing 22A and a second flange associated with the other lower finger 18B received in the housing 22B.

Preferably, each finger 16 and/or 18 is provided with a cylindrical sleeve 52 capable of providing a function of filtering vibrations and damping and inside which the finger 16, 18 penetrates transversely, each sleeve 52 cooperating in the final position with at least one part of the internal wall 54 defining the associated housing 20 and/or 22.

Preferably, the central part 40 of the flange 30 comprises a concave internal profile 56 intended to cooperate with a part of the external cylindrical surface 58 of the sleeve 52 received in the associated lower housing 22.

As illustrated by FIGS. 2 to 8, the method of mounting the heat exchanger 12 on the structural element 14 comprises successively:

a first mounting step during which the exchanger 12 is moved into an initial inclined position so as to carry out the hooking of at least one part of the heat exchanger 12 to the structural element 14;

a second mounting step during which the heat exchanger 12 thus hooked in an intermediate inclined position is capable of being displaced by rotation to a final vertical position; and a third mounting step during which the heat exchanger is locked to the structural element 14 by locking means.

Naturally, the successive operations of the mounting method shown in the figures (and illustrated by the arrows referenced by Roman numerals for the principal steps) are not limiting, the third step depending quite particularly on the locking means 28 used.

Thus, the pivot which permits the rotation of the exchanger 12 between its intermediate inclined position and final vertical position could be obtained in a similar manner by the cooperation of the lower fingers 18A, 18B with the complementary housings 22A, 22B of the structural element 14 and not the upper fingers 16A, 16B.

More specifically, in a similar manner it might be possible to reverse the function associated with each pair 16, 18 of fingers so as to introduce the lower fingers 18A, 18B to form the pivoting articulation in the lower part of the heat exchanger 12 and to rock the heat exchanger 12 from front to back in the direction of the structural element 14 located at the rear, to introduce, after the lower fingers 18 in the housings 22, the upper fingers 16 in the associated housings 20 in which the locking means 28, such as a flange 30, are capable of immobilizing them longitudinally.

According to a variant, not shown, the locking of the exchanger 12 is obtained automatically by the cooperation of shapes during mounting, i.e. without having recourse to fixing members such as screws.

Such a variant for automatic locking is, for example, capable of being obtained by means of a mounting of the "bayonet" type, or a further similar mounting in which the fingers 16, 18 would be firstly introduced simultaneously in the associated housings 20, 22 through front longitudinal openings, then engaged vertically downwards in a further "L"-shaped housing part.

In such a variant, the fingers 16, 18 would be advantageously immobilized in the longitudinal direction and locking means 28 would preferably have to be provided to lock the fingers in position and avoid any displacement of the fingers in the vertical direction in order to prevent said fingers from being disengaged from the housings 20, 22.

Naturally, the locking flange 30 which has just been disclosed only constitutes one preferred and non-limiting embodiment of the locking means 28 of the heat exchanger 12 on the structural element 14 forming the vehicle front end panel.

Thus, in the above variant, the locking means 28 which are capable of preventing any displacement of the fingers in the vertical direction in order to prevent said fingers from being disengaged from the housings 20, 22 consist, for example, of a pin.

According to a further variant, not shown, the locking means 28 consist of a catch which, preferably mounted fixedly on the structural element 14, is capable of sliding between an extreme open position in which the fingers 18 are capable of being introduced into the lower housings 22 and an extreme locked position in which the fingers 18 (and the sleeves 52) are locked in the lower housings 22, in particular in the longitudinal direction.

According to a further variant, not shown, the locking means 28 consist of at least one locking flange which is pivotably mounted at one of its ends about a longitudinal axis so as to be able to be displaced in rotation about this longitudinal axis between:
  a waiting position in which a hooking finger such as a lower finger 18A, 18B is free to be introduced longitudinally in the associated housing 22, and
  a final locked position in which the flange 30 immobilizes the finger 18 longitudinally in the housing 22 in order to lock the heat exchanger 12 in the final position.

Advantageously, such a locking flange comprises, for example, at one end a hole intended to be passed through by the pivot, for example formed by a screw, which when it is tightened provides the support of the locking flange in the waiting position for which the opening of the housing is freely accessible.

The locking flange is thus advantageously mounted in a captive and fixed manner on the structural element 14.

To carry out the locking after the finger has been introduced into the housing, the screw is released, for example, in order to permit the pivoting of the flange from the waiting position to the final locked position in which the end of the flange opposing the pivot cooperates with an element for retaining the flange in at least the longitudinal direction, the complete immobilization of the flange being able to be obtained, therefore, by further screwing or by the cooperation of shapes of the other end with the retaining element.

According to a variant, not shown, only the fingers of the pair of fingers forming the articulation along the axis X are of transverse orientation, the fingers of the other pair intended to be locked extending, for example, longitudinally to the rear and not transversely on both sides of the exchanger as in the embodiment shown in the figures.

In such a variant, the locking of the heat exchanger 12 in the position of use is, for example, carried out without a flange in the manner disclosed below.

The lower fingers of the exchanger 12 comprise a front longitudinal end which is threaded and which, after each finger has been introduced into a complementary lower housing comprising a suitable longitudinal opening, is capable of being immobilized by means of a nut.

The nut is, for example, mounted from the rear and it cooperates with a part of the housing or the structural element to immobilize the finger in the longitudinal direction, the immobilization in the vertical direction being advantageously obtained as above by the cooperation of shapes with the housing.

According to the invention, the arrangement 10 for mounting the heat exchanger 12 on the vertical structural element 14, forming a motor vehicle front end panel, is characterized by the fact that the heat exchanger 12 comprises means for the mounting thereof on the structural element 14 which consist of the fingers 16 and 18 and by the fact that the structural element 14 comprises housings 20, 22 respectively capable of cooperating with the fingers 16, 18 and finally due to the fact that it comprises locking means 28 capable of immobilizing at least longitudinally the heat exchanger 12 for locking it in the final vertical position corresponding to its position of use.

The present invention advantageously applies to the automotive industry and provides a simple and efficient technical solution to carry out the hooking of a member such as the heat exchanger onto an associated structural element capable of forming the front face of the vehicle.

The invention claimed is:

1. An arrangement for mounting a heat exchanger on a vertical structural element forming a motor vehicle front end panel,
  the heat exchanger comprising means for hooking thereof onto the structural element, which includes at least one first pair of fingers and a second pair of fingers, and the structural element comprising at least first housings and second housings respectively configured to cooperate with the first and second pairs of fingers,
  wherein the first housings of the structural element each comprise, vertically at a top, an opening for permitting vertical introduction into each first housing of a corresponding hooking finger of the first pair, during a first mounting of the heat exchanger, the fingers of the first pair of the exchanger cooperating with the first housings of the structural element to form an articulation by which the heat exchanger is capable of pivoting about a transverse pivot axis in order, during a second mounting, to be moved into a final vertical position in which each of the fingers of the second pair is introduced longitudinally from front to back into an associated second housing of the structural element provided to this end with a front longitudinal opening,
  and wherein, during a third mounting, the heat exchanger is immobilized, at least longitudinally, relative to the structural element by a locking means capable of blocking at least one of the fingers of the second pair in the associated housing, so as to lock the heat exchanger in a final vertical position corresponding to its position of use.

2. The arrangement as claimed in claim 1, wherein in a final position of use, the heat exchanger is suspended by upper fingers of the first pair that cooperate with associated first housings, and is immobilized vertically by lower fingers of the second pair introduced into the associated second housings.

3. The arrangement as claimed in claim 2, wherein the locking means includes at least one flange capable of closing the opening of at least one of the second lower housings to immobilize longitudinally the associated lower finger in the second lower housing and to lock the heat exchanger in the final position of use.

4. An arrangement for mounting a heat exchanger on a vertical structural element forming a motor vehicle front end panel,
  the heat exchanger comprising means for hooking thereof onto the structural element, which respectively include at least one first pair of fingers and a second pair of fingers, and the structural element comprising at least first housings and second housings respectively capable of cooperating with the first and second pairs of fingers, wherein the second housings of the structural element each comprise, vertically at a top, an opening to permit vertical introduction into each second housing of the corresponding hooking finger of the second pair, during a first mounting of the heat exchanger, the fingers of the second pair of the exchanger cooperating with the second housings of the structural element to form an articulation by which the heat exchanger is capable of pivoting about a transverse pivot axis in order, during a second mounting, to be moved into a final vertical position in which each of the fingers of the first pair is introduced longitudinally from front to back into an associated first housing of the structural element provided to this end with a front longitudinal opening, and wherein during a third mounting, the heat exchanger is immobilized, at least longitudinally, relative to the structural element by locking means capable of blocking at least one of the fingers of the first pair in the associated housing, so as to lock the heat exchanger in a final vertical position corresponding to its position of use.

5. The arrangement as claimed in claim 4, wherein in the final position of use, the heat exchanger is suspended by lower fingers of the second pair that cooperate with the associated second housings, and is immobilized vertically by upper fingers of the first pair introduced into associated first housings.

6. The arrangement as claimed in claim 5, wherein the locking means includes at least one flange capable of closing the opening of at least one of the first housings to immobilize longitudinally the associated upper finger in the first housing and to lock the heat exchanger in the final position of use.

7. The arrangement as claimed in claim 6, wherein the flange is mounted on the structural element by an articulated connection arranged at one first end thereof.

8. The arrangement as claimed in claim 7, wherein the flange comprises at least one first stepped end formed by a planar end part connected by a bent portion to a central part and at least the planar end part is capable of being introduced, longitudinally from front to back, into a complementary slot of the structural element so that at least the bent portion cooperates with the slot to form an articulated connection.

9. The arrangement as claimed in claim 8, wherein the flange is capable of pivoting about a transverse axis between at least one initial horizontal position which it occupies after the engagement of its first articulating end, through the slot and a final locked position in which the flange extending generally vertically is capable of preventing the first finger from leaving the first housing through the front longitudinal opening.

10. The arrangement as claimed in claim 9, wherein at least one second end of the flange is capable of being attached fixedly to the structural element so as to immobilize the flange in its final locked position.

11. The arrangement as claimed in claim 10, wherein the second fixing end of the flange is fixed to the structural element by screwing, by at least one fixing screw.

12. The arrangement as claimed in claim 9, wherein the first stepped articulating end of the flange is capable of cooperating with the slot so that the flange is temporarily immobilized in a waiting position in which the flange extends at right angles to the structural element and to the heat exchanger before being folded down, during the third mounting, to its final locked position in which the flange extending generally vertically, closes the associated housing comprising the finger.

13. The arrangement as claimed in claim 6, wherein the locking means including the at least one flange is pre-mounted on the structural element in a captive manner.

* * * * *